United States Patent
Iwahori et al.

(10) Patent No.: US 10,056,646 B2
(45) Date of Patent: Aug. 21, 2018

(54) NONAQUEOUS ELECTROLYTE SOLUTION AND NONAQUEOUS ELECTROLYTE BATTERY

(71) Applicant: MITSUBISHI CHEMICAL CORPORATION, Chiyoda-ku (JP)

(72) Inventors: Masami Iwahori, Yokkaichi (JP); Yasushi Oura, Chiyoda-ku (JP); Kanako Takiguchi, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 770 days.

(21) Appl. No.: 14/491,199

(22) Filed: Sep. 19, 2014

(65) Prior Publication Data

US 2015/0004481 A1 Jan. 1, 2015

Related U.S. Application Data

(63) Continuation of application No. PCT/JP2013/057477, filed on Mar. 15, 2013.

(30) Foreign Application Priority Data

Mar. 19, 2012 (JP) .................. 2012-062205

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0569* (2013.01); *H01M 10/0568* (2013.01)

(58) Field of Classification Search
CPC ......... H01M 10/0567; H01M 10/0525; H01M 10/0569; H01M 10/0568
See application file for complete search history.

(56) References Cited

U.S. PATENT DOCUMENTS

| 5,879,834 A | 3/1999 | Mao |
| 6,919,145 B1 | 7/2005 | Kotato et al. |

(Continued)

FOREIGN PATENT DOCUMENTS

| CN | 1370335 A | 9/2002 |
| CN | 102290599 | 12/2011 |

(Continued)

OTHER PUBLICATIONS

Chang et al., "2,2-Dimethoxypropane as electrolyte additive for lithium-ion batteries," 2007, Journal of Power Sources, 163, 1059-1063.*

(Continued)

*Primary Examiner* — Ula C Ruddock
*Assistant Examiner* — Matthew W Van Oudenaren
(74) *Attorney, Agent, or Firm* — Oblon, McClelland, Maier & Neustadt, L.L.P.

(57) ABSTRACT

A nonaqueous electrolyte solution includes a lithium salt and a nonaqueous solvent that dissolves the lithium salt. The nonaqueous electrolyte solution contains from at least 0.01 ppm to not more than 100 ppm of a compound represented by the following general formula (1):

$$R^1-CR^2OR^3-CR^2_2OR^3 \qquad (1)$$

(in formula (1), $R^1$ and $R^3$ represent an organic group having 1 to 10 carbon atoms and optionally having a substituent; $R^2$ represents hydrogen or an organic group having 1 to 10 carbon atoms and optionally having a substituent; and $R^1$ to $R^3$ may each represent the same group or may each represent different groups).

8 Claims, 1 Drawing Sheet

(51) Int. Cl.
  *H01M 10/0569* (2010.01)
  *H01M 10/0568* (2010.01)

(56) References Cited

U.S. PATENT DOCUMENTS

| | | | |
|---|---|---|---|
| 2005/0175904 A1* | 8/2005 | Gorkovenko | H01M 4/38 429/329 |
| 2011/0311885 A1 | 12/2011 | Yamada et al. | |

FOREIGN PATENT DOCUMENTS

| | | |
|---|---|---|
| JP | 04-162363 | 6/1992 |
| JP | 09-007609 | 1/1997 |
| JP | 9-223517 A | 8/1997 |
| JP | 2005-268094 | 9/2005 |
| JP | 2009-283474 | 12/2009 |
| JP | 2010-073367 | 4/2010 |
| JP | 2011-204918 | 10/2011 |
| KR | 2007-0027512 A | 3/2007 |

OTHER PUBLICATIONS

Chagnes et al., "Imidazolium-organic solvent mixtures as electrolytes for lithium batteries," 2005, Journal of Power Sources, 145, 82-88.*
Extended European Search Report dated Apr. 14, 2015 in Patent Application No. 13765069.3.
Office Action dated Nov. 6, 2015 in Korean Patent Application No. 10-2014-7026440 (with English language translation).
Chinese Office Action and Search Report dated Dec. 29, 2015, in corresponding Chinese Patent Application No. 201380015215.4 (with English-language Translation).
Korean Office Action dated Apr. 27, 2016 in Patent Application No. 10-2014-7026440 (with English language translation).
Office Action dated Aug. 23, 2016 in Chinese Patent Application No. 201380015215.4 (with unedited computer generated English translation).
Korean Final Rejection dated Aug. 16, 2016 in Patent Application No. 10-2014-7026440 (with machine-generated English translation).
Office Action dated Nov. 22, 2016 in Japanese Patent Application No. 2014-506203 (with unedited computer generated English language translation).
European Office Action dated Jan. 2, 2017 in Patent Application No. 13 765 069.3.
Chinese Office Action dated Feb. 27, 2017 in Patent Application No. 201380015215.4 (with English Translation).
International Preliminary Report on Patentability and Written Opinion dated Oct. 2, 2014 in PCT/JP2013/057477 (submitting English language translation only).
International Search Report dated Jun. 25, 2013 in PCT/JP2013/057477 filed Mar. 15, 2013.
Masaki Yoshio and Akiya Kozawa, "Lithium Ion Secondary Batteries: Materials and Applications", Nikkan Kogyo Shinbun, Ltd., 1996, pp. 76-77 with partial English translation.
Office Action dated Dec. 13, 2017, issued in corresponding European Application No. 13765069.3.

* cited by examiner

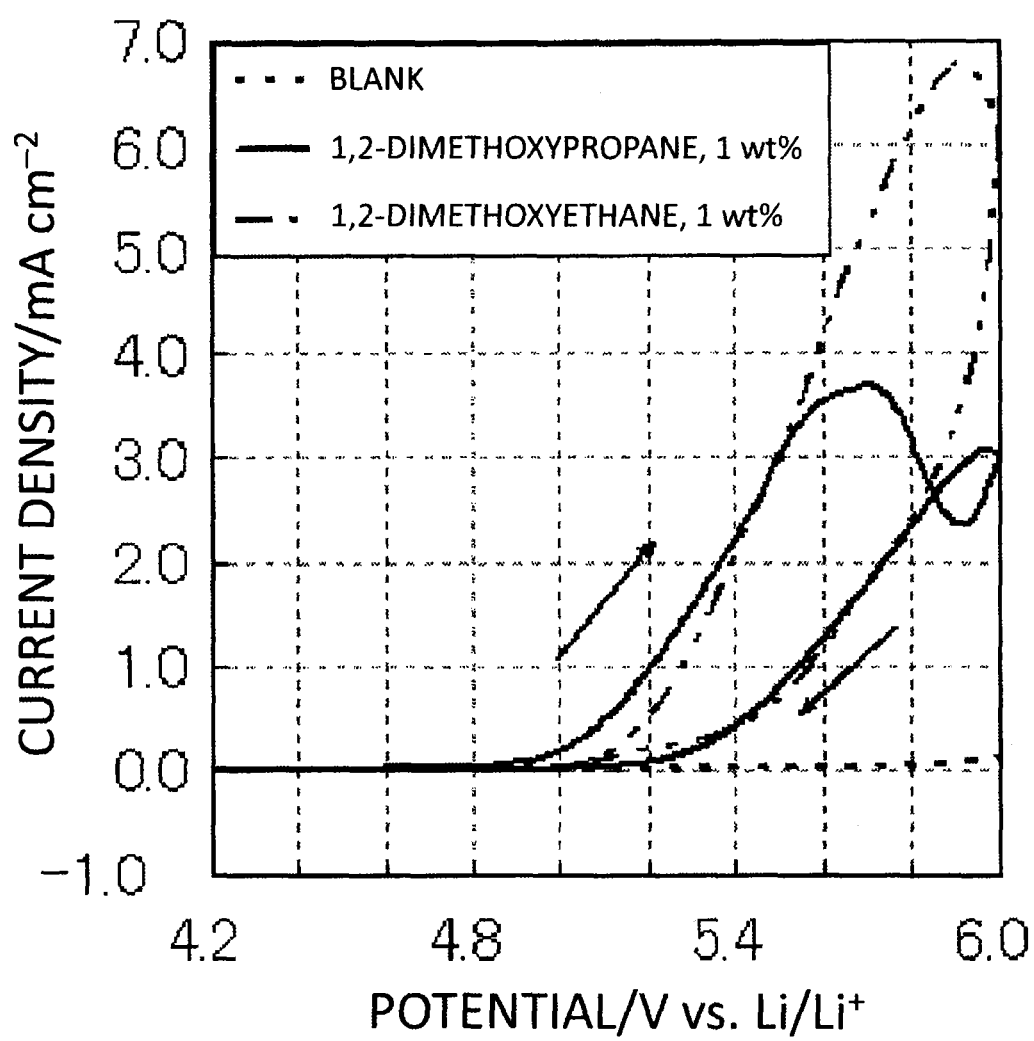

NONAQUEOUS ELECTROLYTE SOLUTION AND NONAQUEOUS ELECTROLYTE BATTERY

CROSS-REFERENCE TO RELATED APPLICATION

This is a continuation of International Application PCT/JP2013/057477, filed on Mar. 15, 2013, and designated the U.S., and claims priority from Japanese Patent Application 2012-062205 which was filed on Mar. 19, 2012, the entire contents of which are incorporated herein by reference.

TECHNICAL FIELD

The present invention relates to a nonaqueous electrolyte secondary battery and a nonaqueous electrolyte solution for use in the nonaqueous electrolyte secondary battery.

BACKGROUND ART

Nonaqueous electrolyte secondary batteries, such as lithium secondary batteries, are being used as a wide variety of power sources, ranging from power sources for so-called portable electronic devices such as mobile phones and notebooks, to large stationary power sources as well as automotive power sources for driving, in automobiles or the like. However, the demands placed on the secondary batteries that are used have become ever more challenging in recent years, accompanying the higher performances of electronic devices and the growing use of secondary batteries as automotive power sources for driving and as large stationary power sources. It is now required that the characteristics of secondary batteries afford high battery performance levels in terms of, for instance, higher capacity, and improved high-temperature storage characteristics and cycle characteristics.

Ordinarily, the electrolyte solutions that are used in nonaqueous electrolyte secondary batteries are mainly made up of an electrolyte and a nonaqueous solvent. Examples of the main component of the nonaqueous solvent include, for instance, cyclic carbonates such as ethylene carbonate or propylene carbonate; chain carbonates such as dimethyl carbonate, diethyl carbonate or ethyl methyl carbonate; and cyclic carboxylic acid esters such as γ-butyrolactone, γ-valerolactone or the like.

As mentioned above, the characteristics of nonaqueous electrolyte secondary batteries, in particular nonaqueous electrolyte lithium secondary batteries, specifically higher capacity and improved high-temperature storage characteristic, cycle characteristic and so forth, call for ongoing improvement given the relentless demand for higher performance in secondary batteries in recent years.

The following methods for raising the capacity, for example, have been examined: pressing the active material layer of the electrode in order to reduce, as much as possible, the volume within the battery that is outside the material; broadening the utilization range of the positive electrode to support use to higher potentials. However, when the capacity is raised by pressing the active material layer of the electrode, it is then difficult to achieve uniformity for the active material and a portion of the lithium will precipitate due to nonuniform reactions and/or deterioration of the active material will be facilitated, and the ability to obtain satisfactory properties is thus readily impaired. When the positive electrode utilization range is broadened in support of use at higher potentials, the activity of the positive electrode undergoes an additional increase and an acceleration of the deterioration induced by reactions between the positive electrode and the electrolyte solution is then prone to occur.

Another problem brought about by reducing the void space within the battery in pursuit of higher capacities is that the internal pressure of the battery undergoes a substantial increase when even small amounts of gas are generated by degradation of the electrolyte solution. In particular, in almost all cases where a nonaqueous electrolyte secondary battery is used as a back-up power source for power outages or as a power source for portable devices, a weak current is supplied in order to compensate for battery self-discharge, thus establishing a state of constant discharge. Due, in such a continuous charging state, to heat generation by the device at the same time that the electrode active materials are continually in a highly active state, capacity deterioration by the battery is accelerated and gas generation due to degradation of the electrolyte solution is prone to occur. When large amounts of gas are generated, the safety valve ultimately operates in the case of a battery in which a safety valve operates when an abnormal increase, e.g., overcharging, is detected. For a battery not equipped with a safety valve, the battery may be swollen by the pressure of the generated gas and the battery itself may become unusable. These problems become even more severe when the nonaqueous electrolyte secondary battery is placed in a high-temperature environment.

For example, in the case of a nonaqueous electrolyte secondary battery that uses the electrolyte solution described in Patent Document 1, it is taught that excellent charge/discharge cycling characteristics are exhibited through the incorporation in the nonaqueous electrolyte of a specific compound having an ether linkage. However, this is still unsatisfactory in particular because the battery characteristics decline in high-temperature environments.

A compound containing an ether linkage has been introduced with the goal of improving the cycle characteristics of nonaqueous electrolyte secondary batteries (Patent Document 2). However, because ether linkage-containing compounds have a lower oxidative decomposition potential than carbonates and carboxylate esters (Non-patent Document 1), the problem here has been unsatisfactory high-temperature storage characteristics and unsatisfactory high-temperature continuous charging properties.

CITATION LIST

Patent Documents

[Patent Document 1] Japanese Patent Application Laid-open No. H9-106835
[Patent Document 2] Japanese Patent Application Laid-open No. H9-223517

Non-Patent Document

[Non-patent Document 1] Lithium Ion Secondary Batteries: Materials and Applications, Masaki Yoshio and Akiya Kozawa, Nikkan Kogyo Shinbun, Ltd., 1996.

SUMMARY OF INVENTION

Technical Problem

Considering the problems identified above, the objects of the present invention are to provide a nonaqueous electrolyte battery that exhibits excellent high-temperature continuous charging properties and to provide a nonaqueous electrolyte solution that gives such a nonaqueous electrolyte battery.

Solution to Problem

The present inventors carried out extensive and intensive investigations in order to achieve these objects and as a result discovered that the problems identified above can be solved by the incorporation in the electrolyte solution of a compound having a specific structure. The present invention was achieved based on this discovery.

Thus, the essential features of the present invention are as given in the following.

(a) A nonaqueous electrolyte solution comprising a lithium salt and a nonaqueous solvent that dissolves the lithium salt, wherein the nonaqueous electrolyte solution contains from at least 0.01 ppm to not more than 100 ppm of a compound represented by the following general formula (1):

$$R^1\text{—}CR^2OR^3\text{—}CR^2{}_2OR^3 \tag{1}$$

(in formula (1), $R^1$ and $R^3$ represent an organic group having 1 to 10 carbon atoms and optionally having a substituent; $R^2$ represents hydrogen or an organic group having 1 to 10 carbon atoms and optionally having a substituent; and $R^1$ to $R^3$ may each represent the same group or may each represent different groups).

(b) The nonaqueous electrolyte solution according to (a), wherein the nonaqueous electrolyte solution contains the compound represented by general formula (1) at from at least 0.01 ppm to not more than 80 ppm.

(c) A nonaqueous electrolyte solution comprising a lithium salt and a nonaqueous solvent that dissolves the lithium salt, wherein the nonaqueous solvent contains from at least 0.01 ppm to not more than 150 ppm of a compound represented by the following general formula (1)

$$R^1\text{—}CR^2OR^3\text{—}CR^2{}_2OR^3 \tag{1}$$

(in formula (1), $R^1$ and $R^3$ represent an organic group having 1 to 10 carbon atoms and optionally having a substituent; $R^2$ represents hydrogen or an organic group having 1 to 10 carbon atoms and optionally having a substituent; and $R^1$ to $R^3$ may each represent the same group or may each represent different groups).

(d) The nonaqueous electrolyte solution according to any one of (a) to (c), wherein the nonaqueous solvent comprises at least dimethyl carbonate or ethyl methyl carbonate.

(e) The nonaqueous electrolyte solution according to any one of (a) to (d), wherein the compound represented by general formula (1) is 1,2-dimethoxypropane or 1,2-dimethoxybutane.

(f) A nonaqueous electrolyte battery comprising a nonaqueous electrolyte and a negative electrode and a positive electrode that are capable of the insertion and extraction of the lithium ion, wherein the nonaqueous electrolyte solution is the nonaqueous electrolyte solution according to any one of (a) to (e).

(g) The nonaqueous electrolyte battery according to (f), wherein the negative electrode contains a carbon material as a negative electrode active material.

(h) A dimethyl carbonate that contains from at least 0.01 ppm to not more than 250 ppm of 1,2-dimethoxypropane.

Advantageous Effects of Invention

The present invention can provide a nonaqueous electrolyte battery that has a high capacity and excellent high-temperature storage characteristics and in particular that has excellent high-temperature continuous charging properties, and can achieve a smaller size and higher performance for nonaqueous electrolyte batteries.

BRIEF DESCRIPTION OF DRAWINGS

FIG. 1 contains cyclic voltammograms (CV) for 1,2-dimethoxypropane and 1,2-dimethoxyethane.

DESCRIPTION OF EMBODIMENTS

Embodiments of the present invention will be hereinafter explained, but the present invention is not limited to the embodiments below, and may be carried out in various ways without departing from the spirit of the present invention.

<Nonaqueous Electrolyte Solution>

The nonaqueous electrolyte of the present invention generally has as its main components an electrolyte and a solvent that dissolves this electrolyte, just as for nonaqueous electrolytes in general, but also contains a compound represented by general formula (1).

$$R^1\text{—}CR^2OR^3\text{—}CR^2{}_2OR^3 \tag{1}$$

(In formula (1), $R^1$ and $R^3$ represent an organic group having 1 to 10 carbon atoms and optionally having a substituent and $R^2$ represents hydrogen or an organic group having 1 to 10 carbon atoms and optionally having a substituent. $R^1$ to $R^3$ may each represent the same group or may each represent different groups.)

The organic group having 1 to 10 carbon atoms and optionally having a substituent, which is represented by $R^1$ and $R^3$ in general formula (1), can be exemplified by alkyl groups having 1 to 10 carbon atoms, alkenyl groups having 2 to 10 carbon atoms, aryl groups having 6 to 10 carbon atoms, and aralkyl groups having 7 to 10 carbon atoms.

The alkyl groups having 1 to 10 carbon atoms can be exemplified by the methyl group, trifluoromethyl group, ethyl group, n-propyl group, i-propyl group, n-butyl group, i-butyl group, sec-butyl group, t-butyl group, n-pentyl group, t-amyl group, n-hexyl group, 1,1-dimethylbutyl group, cyclobutyl group, cyclopentyl group, cyclohexyl group, 1-methylcyclohexyl group, and 1-ethylcyclohexyl group. The alkyl groups having 1 to 6 carbon atoms are preferred among the preceding and alkyl groups having 1 to 4 carbon atoms are particularly preferred. These alkyl groups may be chain or cyclic, with chain alkyl groups being preferred therebetween.

The alkenyl groups having 2 to 10 carbon atoms can be exemplified by the vinyl group and propenyl group. Alkenyl groups having 2 to 8 carbon atoms are preferred among the preceding and alkenyl groups having 2 to 4 carbon atoms are particularly preferred.

The aryl groups having 6 to 10 carbon atoms can be exemplified by the phenyl group, pentafluorophenyl group, tolyl group, xylyl group, cyclohexylphenyl group, and t-butylphenyl group, among which the phenyl group, cyclohexylphenyl group, and t-butylphenyl group are preferred.

The aralkyl groups having 7 to 10 carbon atoms can be exemplified by the benzyl group and phenethyl group with the benzyl group being preferred.

The substituent that may be present can be exemplified by alkyl groups possibly containing a heteroatom or a halogen atom, alkenyl groups, alkynyl groups, aryl groups, alkoxy groups, the cyano group, the isocyanate group, the ether group, the carbonate group, the carbonyl group, the carboxyl group, the sulfonyl group, and the phosphoryl group.

The alkyl group having 1 to 10 carbon atoms, alkenyl group having 2 to 10 carbon atoms, aryl group having 6 to 10 carbon atoms, and aralkyl group having 7 to 10 carbon atoms may be substituted by a halogen atom. The fluorine-substituted groups can be exemplified by fluorinated alkyl groups such as the trifluoromethyl group, trifluoroethyl group, and pentafluoroethyl group; fluorinated alkenyl groups such as the 2-fluorovinyl group and 3-fluoro-2-propenyl group; fluorinated aryl groups such as the 2-fluorophenyl group, 3-fluorophenyl group, and 4-fluorophenyl group; and fluorinated aralkyl groups such as the 2-fluorobenzyl group, 3-fluorobenzyl group, and 4-fluorobenzyl group.

Among the preceding, $R^1$ and $R^3$ are more preferably a group selected from the group consisting of the methyl group, ethyl group, n-propyl group, i-propyl group, n-butyl group, t-butyl group, t-amyl group, cyclopentyl group, cyclohexyl group, vinyl group, phenyl group, and trifluoromethyl group. A group selected from the group consisting of the methyl group, ethyl group, t-butyl group, and trifluoromethyl group is even more preferred.

$R^2$ in general formula (1) represents hydrogen or an organic group having 1 to 10 carbon atoms and optionally having a substituent and can be exemplified as for $R^1$ and $R^3$ above, among which the methyl group, ethyl group, n-propyl group, and n-butyl group are preferred.

Viewed from the standpoint of improving the high-temperature continuous charging properties, a compound in which $R^1$ and $R^3$ in the compound with general formula (1) are the methyl group or ethyl group and $R^2$ is the hydrogen atom is particularly preferred while a compound in which $R^1$ and $R^3$ are the methyl group and $R^2$ is the hydrogen atom is most preferred. Thus, 1,2-dimethoxypropane, 1,2-diethoxypropane, 1,2-dimethoxybutane, and 1,2-diethoxybutane are particularly preferred and 1,2-dimethoxypropane is most preferred. The compound represented by formula (1) may be used singly as one type, or as two or more types in combinations.

The proportion of the compound represented by general formula (1) in the nonaqueous electrolyte is generally at least 0.01 ppm and is preferably at least 0.05 ppm, more preferably at least 0.1 ppm, and even more preferably at least 0.25 ppm. It is difficult for the effects of the present invention to appear at a concentration less than this. In contrast, the storage characteristics of the battery may be reduced when the concentration is too high, and this proportion is therefore generally not more than 100 ppm, preferably not more than 80 ppm, more preferably not more than 50 ppm, even more preferably not more than 30 ppm, and particularly preferably not more than 25 ppm.

The proportion of the compound represented by general formula (1) in the nonaqueous solvent in the nonaqueous electrolyte solution is generally at least 0.01 ppm, preferably at least 0.05 ppm, more preferably at least 0.1 ppm, and even more preferably at least 0.25 ppm. It is difficult for the effects of the present invention to appear at a concentration less than this. In contrast, the storage characteristics of the battery may be reduced when the concentration is too high, and this proportion is therefore generally not more than 150 ppm, preferably not more than 100 ppm, more preferably not more than 80 ppm, even more preferably not more than 50 ppm, and particularly preferably not more than 30 ppm.

While described below, the use of dimethyl carbonate for the nonaqueous solvent is preferred, and when the compound with general formula (1) is 1,2-dimethoxypropane, the proportion of the 1,2-dimethoxypropane with reference to the dimethyl carbonate is generally at least 0.01 ppm and is preferably at least 0.05 ppm, more preferably at least 0.1 ppm, and even more preferably at least 0.25 ppm. It is difficult for the effects of the present invention to appear at a concentration less than this. In contrast, the storage characteristics of the battery are reduced when the concentration is too high, and this proportion is therefore generally not more than 250 ppm, preferably not more 150 ppm, more preferably not more than 100 ppm, even more preferably not more than 50 ppm, and particularly preferably not more than 40 ppm.

The reason why the nonaqueous electrolyte according to the present invention provides improved storage characteristics and improved continuous charging properties under high temperature and high voltage conditions is not clear, but the following is postulated although the present invention is not limited to the principle of action described in the following.

The compound with general formula (1) contains $R^1$ and $R^3$, which are organic groups having 1 to 10 carbon atoms. In general, the oxidation potential of a compound in which a hydrogen atom has been substituted by an alkyl group is lowered due to the electron donating character of the alkyl group. For example, when the cyclic voltammogram (CV) of 1,2-dimethoxyethane is compared with the cyclic voltammogram of 1,2-dimethoxypropane, which is given by substituting one hydrogen atom in dimethoxyethane with a methyl group, the oxidation potential for 1,2-dimethoxypropane is shown to be lower than that for 1,2-dimethoxyethane.

During the initial charge, the compound represented by general formula (1) forms a coating film, together with other components of the electrolyte solution, at the surface of the positive electrode. Since the compound with general formula (1) has a lower oxidation potential than the unsubstituted compound, it reacts faster than the other components of the electrolyte solution, and it is thought that a strong coating film is formed due to this. It is thought that this coating film prevents contact between the electrolyte solution and the high-activity electrode and thus inhibits secondary reactions that may appear in the battery interior, thereby improving the storage characteristics and the continuous charging properties at high temperatures.

When, in particular, $R^1$ and $R^3$ in the compound with general formula (1) are the methyl group or ethyl group, it is thought that, due to the low steric hindrance by the alkyl group taken into the coating film, the decline in the battery properties after high-temperature continuous charging can be strongly suppressed while maintaining the lithium ion permeability.

(The Electrolyte)

There are no limitations on the electrolyte used in the nonaqueous electrolyte solution of the present invention, and any known electrolyte used as an electrolyte in the intended nonaqueous electrolyte secondary battery can be used.

A lithium salt is generally used as the electrolyte when the nonaqueous electrolyte solution of the present invention is used in a lithium secondary battery.

The electrolyte can be specifically exemplified by inorganic lithium salts such as $LiClO_4$, $LiAsF_6$, $LiPF_6$, $LiBF_4$, and $LiFSO_3$; fluorine-containing organic lithium salts such as $LiCF_3SO_3$, $LiN(CF_3SO_2)_2$, $LiN(C_2F_5SO_2)_2$, lithium cyclic 1,2-tetrafluoroethanedisulfonylimide, lithium cyclic 1,3-hexafluoropropanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; and lithium dicarboxylate complexes such as lithium bis(oxalato)borate, lithium difluorooxalatoborate, lithium tris(oxalato)phosphate, lithium difluorobis(oxalato)phosphate, and lithium tetrafluorooxalatophosphate.

Preferred among the preceding are $LiPF_6$, $LiBF_4$, $LiFSO_3$, $LiCF_3SO_3$, $LiN(CF_3SO_2)_2$, $LiN(C_2F_5SO_2)_2$, lithium cyclic 1,2-tetrafluoroethanedisulfonylimide, lithium cyclic 1,3-hexafluoropropanedisulfonylimide, lithium bis(oxalato)borate, lithium difluorooxalatoborate, lithium tris(oxalato)phosphate, lithium difluorobis(oxalato)phosphate, and lithium tetrafluorooxalatophosphate, with $LiPF_6$ and $LiBF_4$ being particularly preferred.

These lithium salts be used singly as one type, or as two or more types in any combinations and ratios.

The co-use of specific inorganic lithium salts with each other and the co-use of an inorganic lithium salt with a fluorine-containing organic lithium salt and/or a lithium dicarboxylate complex are preferred because this suppresses gas generation during high-temperature storage or suppresses deterioration after high-temperature storage.

In particular, the co-use of $LiPF_6$ with $LiBF_4$ is preferred, as is the co-use of an inorganic lithium salt, such as $LiPF_6$ or $LiBF_4$, with a fluorine-containing organic lithium salt, e.g., $LiCF_3SO_3$, $LiN(CF_3SO_2)_2$, $LiN(C_2F_5SO_2)_2$, lithium cyclic 1,2-tetrafluoroethanedisulfonylimide, or lithium cyclic 1,3-hexafluoropropanedisulfonylimide, and/or with a lithium dicarboxylate complex, e.g., lithium bis(oxalato) borate, lithium difluorooxalatoborate, lithium tris(oxalato) phosphate, lithium difluorobis(oxalato)phosphate, or lithium tetrafluorooxalatophosphate.

When $LiPF_6$ is used in combination with $LiBF_4$, the proportion of the $LiBF_4$ in the total of the $LiPF_6$ and $LiBF_4$ is preferably at least 0.01 mass %, more preferably at least 0.05 mass %, and even more preferably at least 0.1 mass % and is preferably not more than 20 mass %, more preferably not more than 10 mass %, even more preferably not more than 5 mass %, and particularly preferably not more than 3 mass %.

The desired effects may not be obtained at below this range, while the battery characteristics, e.g., the high-load discharge characteristics, may be reduced when this range is exceeded.

When, on the other hand, an inorganic lithium salt, such as $LiPF_6$ or $LiBF_4$, is used in combination with a fluorine-containing organic lithium salt, e.g., $LiCF_3SO_3$, $LiN(CF_3SO_2)_2$, $LiN(C_2F_5SO_2)_2$, lithium cyclic 1,2-tetrafluoroethanedisulfonylimide, and lithium cyclic 1,3-hexafluoropropanedisulfonylimide, and/or with a lithium dicarboxylate complex, e.g., lithium bis(oxalato)borate, lithium difluorooxalatoborate, lithium tris(oxalato)phosphate, lithium difluorobis(oxalato)phosphate, and lithium tetrafluorooxalatophosphate, the proportion of the inorganic lithium salt in the total of the two is preferably at least 70 mass %, more preferably at least 80 mass %, and even more preferably at least 85 mass % and is preferably not more than 99 mass % and more preferably not more than 95 mass %.

There are no particular limitations on the concentration of these electrolytes in the nonaqueous electrolyte solution in order to realize the effects of the present invention, but this concentration is preferably at least 0.5 mol/L, more preferably at least 0.8 mol/L, and even more preferably at least 1.0 mol/L. It is preferably not more than 3 mol/L, more preferably not more than 2 mol/L, even more preferably not more than 1.8 mol/L, and particularly preferably not more than 1.6 mol/L.

If the concentration is excessively low, the electrical conductivity of the electrolyte solution may be insufficient in some instances. If the concentration is excessively high, on the other hand, viscosity becomes higher, and hence electric conductance may decrease, and battery performance may decrease.

(The Nonaqueous Solvent)

The nonaqueous solvent used is also selected as appropriate from among the nonaqueous solvents heretofore known as solvents in nonaqueous electrolytes. Examples here are cyclic carbonates, chain carbonates, cyclic carboxylate esters, chain carboxylate esters, sulfur-containing organic solvents, phosphorus-containing organic solvents, and aromatic fluorine-containing solvents.

The cyclic carbonates can be exemplified by alkylene carbonates that have an alkylene group having 2 to 4 carbon atoms, e.g., ethylene carbonate, propylene carbonate, and butylene carbonate, whereamong ethylene carbonate and propylene carbonate are preferred from the standpoint of improving the battery properties and ethylene carbonate is particularly preferred. A portion of the hydrogen in these compounds may be replaced by fluorine.

The fluorine-substituted cyclic carbonates can be exemplified by alkylene carbonates that have a fluorine-substituted alkylene group having 2 to 4 carbon atoms, e.g., fluoroethylene carbonate, 1,2-difluoroethylene carbonate, 1,1-difluoroethylene carbonate, 1,1,2-trifluoroethylene carbonate, tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, and trifluoromethylethylene carbonate, whereamong fluoroethylene carbonate, 1,2-difluoroethylene carbonate, and trifluoromethylethylene carbonate are preferred.

The chain carbonate is preferably a dialkyl carbonate, and the number of carbons in each of the constituent alkyl groups is preferably 1 to 5 and particularly preferably 1 to 4. Specific examples here are symmetric chain alkyl carbonates such as dimethyl carbonate, diethyl carbonate, and di-n-propyl carbonate, and asymmetric chain alkyl carbonates such as ethyl methyl carbonate, methyl n-propyl carbonate, and ethyl n-propyl carbonate, whereamong dimethyl carbonate, diethyl carbonate, and ethyl methyl carbonate are preferred from the standpoint of improving the battery properties. A portion of the hydrogen in the alkyl group may be replaced by fluorine.

The fluorine-substituted chain carbonates can be exemplified by bis(fluoromethyl)carbonate, bis(difluoromethyl) carbonate, bis(trifluoromethyl)carbonate, bis(2-fluoroethyl) carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trisfluoroethyl methyl carbonate.

The cyclic carboxylate esters can be exemplified by γ-butyrolactone and γ-valerolactone and by compounds provided by replacing a portion of the hydrogen in the preceding compounds with fluorine.

The chain carboxylate esters can be exemplified by methyl acetate, ethyl acetate, propyl acetate, isopropyl acetate, butyl acetate, sec-butyl acetate, isobutyl acetate, t-butyl acetate, methyl propionate, ethyl propionate, propyl propionate, isopropyl propionate, methyl butyrate, ethyl butyrate, propyl butyrate, methyl valerate, and ethyl valerate, and also by compounds provided by replacing a portion of the hydrogen in the preceding compounds with fluorine, such as propyl trifluoroacetate and butyl trifluoroacetate. Methyl acetate, ethyl acetate, propyl acetate, butyl acetate, methyl propionate, ethyl propionate, propyl propionate, methyl butyrate, ethyl butyrate, and methyl valerate are more preferred.

The sulfur-containing organic solvent can be exemplified by sulfolane, 2-methylsulfolane, 3-methylsulfolane, diethyl sulfone, ethyl methyl sulfone, and methyl propyl sulfone and by compounds provided by replacing a portion of the hydrogen in the preceding compounds with fluorine.

The phosphorus-containing organic solvents can be exemplified by trimethyl phosphate, triethyl phosphate, ethyl dimethyl phosphate, diethyl methyl phosphate, methyl ethylene phosphate, and ethyl ethylene phosphate and by compounds provided by replacing a portion of the hydrogen in the preceding compounds with fluorine.

The aromatic fluorine-containing solvents can be exemplified by fluorobenzene, difluorobenzene, trifluorobenzene, tetrafluorobenzene, pentafluorobenzene, hexafluorobenzene, and benzotrifluoride.

The foregoing may be used alone or in combination of two or more; however, it is preferable to use two or more compounds in combination. For example, the co-use of a high dielectric constant solvent, e.g., a cyclic carbonate or a cyclic carboxylate ester, with a low-viscosity solvent, e.g., a chain carbonate or a chain carboxylate ester, is preferred.

Combinations that are mainly an alkylene carbonate and a dialkyl carbonate are a preferred nonaqueous solvent combination. Here, the total of the alkylene carbonate and dialkyl carbonate in the nonaqueous solvent is preferably at least 70 volume %, more preferably at least 80 volume %, and even more preferably at least 90 volume %, while the proportion of the alkylene carbonate with respect to the total of the alkylene carbonate and dialkyl carbonate is preferably at least 5 volume %, more preferably at least 10 volume %, and even more preferably at least 15 volume % and is preferably not more than 50 volume %, more preferably not more than 35 volume %, even more preferably not more than 30 volume %, and particularly preferably not more than 25 volume %. The balance between the cycle characteristics and the high-temperature storage characteristics (particularly the high-load discharge capacity and the residual capacity after high-temperature storage) can be improved when the battery is fabricated using a combination of these nonaqueous solvents.

Ethylene carbonate, propylene carbonate, and fluoroethylene carbonate are preferred for the alkylene carbonate from the standpoint of the cycle characteristics of the battery and improving the high-temperature storage characteristics.

The following are specific examples of preferred combinations of ethylene carbonate with dialkyl carbonate: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Other preferred combinations are provided by the addition of propylene carbonate to the aforementioned ethylene carbonate+dialkyl carbonate combinations.

When propylene carbonate is incorporated, the volume ratio between the ethylene carbonate and the propylene carbonate is preferably 99:1 to 40:60 and is particularly preferably 95:5 to 50:50. In addition, the proportion of the propylene carbonate in the nonaqueous solvent as a whole is preferably at least 0.1 volume %, more preferably at least 1 volume %, and even more preferably at least 2 volume % and is preferably not more than 20 volume %, more preferably not more than 8 volume %, and even more preferably not more than 5 volume %. The propylene carbonate content is preferably in the indicated concentration range because the properties of the ethylene carbonate+dialkyl carbonate combination are then maintained intact while excellent low-temperature properties are also obtained.

Among ethylene carbonate+dialkyl carbonate combinations, combinations that contain an asymmetric chain alkyl carbonate as the dialkyl carbonate are more preferred and combinations that contain ethylene carbonate plus a symmetric chain alkyl carbonate plus an asymmetric chain alkyl carbonate, e.g., ethylene carbonate+dimethyl carbonate+ ethyl methyl carbonate, ethylene carbonate+diethyl carbonate+ethyl methyl carbonate, and ethylene carbonate+dimethyl carbonate+diethyl carbonate+ethyl methyl carbonate, are particularly preferred because they have an excellent balance between the cycle characteristics and the high-current discharge characteristics. Among the preceding, the asymmetric chain alkyl carbonate is preferably ethyl methyl carbonate and the alkyl group in the alkyl carbonate preferably has 1 or 2 carbons.

The following are specific examples of preferred combinations of fluoroethylene carbonate with dialkyl carbonate: fluoroethylene carbonate and dimethyl carbonate; fluoroethylene carbonate and diethyl carbonate; fluoroethylene carbonate and ethyl methyl carbonate; fluoroethylene carbonate, dimethyl carbonate, and diethyl carbonate; fluoroethylene carbonate, dimethyl carbonate, and ethyl methyl carbonate; fluoroethylene carbonate, diethyl carbonate, and ethyl methyl carbonate; and fluoroethylene carbonate, dimethyl carbonate, diethyl carbonate, and ethyl methyl carbonate.

Compositions provided by the addition of ethylene carbonate and/or propylene carbonate to these fluoroethylene carbonate+dialkyl carbonate compositions are also preferred compositions.

In addition, when diethyl carbonate is incorporated in the nonaqueous solvent, gas generation during high-temperature storage can be inhibited when the diethyl carbonate is incorporated in a range that provides a proportion for the diethyl carbonate in the total nonaqueous solvent of preferably at least 10 volume %, more preferably at least 20 volume %, even more preferably at least 25 volume %, and particularly preferably at least 30 volume % and preferably not more than 90 volume %, more preferably not more than 80 volume %, even more preferably not more than 75 volume %, and particularly preferably not more than 70 volume %.

When dimethyl carbonate is incorporated in the nonaqueous solvent, the load characteristics of the battery can be improved when the dimethyl carbonate is incorporated in a range that provides a proportion for the dimethyl carbonate in the total nonaqueous solvent of preferably at least 10 volume %, more preferably at least 20 volume %, even more preferably at least 25 volume %, and particularly preferably at least 30 volume % and preferably not more than 90 volume %, more preferably not more than 80 volume %, even more preferably not more than 75 volume %, and particularly preferably not more than 70 volume %.

Among the preceding, the incorporation of dimethyl carbonate and ethyl methyl carbonate and the incorporation of the dimethyl carbonate in a greater proportion than for the ethyl methyl carbonate is preferred because this can improve the battery characteristics after high-temperature storage while maintaining the electrical conductivity of the electrolyte solution.

Viewed in terms of raising the conductivity of the electrolyte solution and improving the battery characteristics post-storage, the volumetric ratio of the dimethyl carbonate to the ethyl methyl carbonate (dimethyl carbonate/ethyl methyl carbonate) in the overall nonaqueous solvent is preferably at least 1.1, more preferably at least 1.5, and even more preferably at least 2.5. Viewed in terms of improving the battery characteristics at low temperatures, this volumetric ratio (dimethyl carbonate/ethyl methyl carbonate) is preferably not more than 40, more preferably not more than 20, even more preferably not more than 10, and particularly preferably not more than 8.

Combinations that are mainly an alkylene carbonate and a dialkyl carbonate as described in the preceding may also incorporate other solvents, e.g., cyclic carbonates and chain carbonates other than the indicated alkylene carbonates and dialkyl carbonates, as well as cyclic carboxylate esters, chain carboxylate esters, sulfur-containing organic solvents, phosphorus-containing organic solvents, and aromatic fluorine-containing solvents.

Other examples of preferred nonaqueous solvents are nonaqueous solvents in which at least one organic solvent selected from the group consisting of ethylene carbonate, propylene carbonate, and butylene carbonate—or a mixed solvent containing at least two organic solvents selected from this same group—takes up at least 60 volume % of the total. Solution leakage and solvent evaporation, even during use at high temperatures, can be minimized with a nonaqueous electrolyte that uses such a mixed solvent. Here, a good balance between the cycle characteristics and high-temperature storage characteristics can be brought about by using a nonaqueous solvent in which the total of the ethylene carbonate and propylene carbonate in the nonaqueous solvent is preferably at least 70 volume %, more preferably at least 80 volume %, and even more preferably at least 90 volume % and the ethylene carbonate:propylene carbonate volumetric ratio is preferably 30:70 to 60:40.

In this Description, the volume of a nonaqueous solvent is the value measured at 25° C., while the value measured at the melting point is used for those that are solid at 25° C., such as ethylene carbonate.

(Other Compounds)

The nonaqueous electrolyte according to the present invention may contain, within a range in which the effects of the present invention are not impaired, other compounds as auxiliary agents, for example, the heretofore known overcharge inhibitors and/or at least one compound selected from the group consisting of cyclic carbonate compounds having a carbon-carbon unsaturated bond, cyclic carbonate compounds having the fluorine atom, monofluorophosphate salts, and difluorophosphate salts.

Among the preceding, the incorporation of at least one compound selected from the group consisting of cyclic carbonate compounds having a carbon-carbon unsaturated bond, cyclic carbonate compounds having the fluorine atom, monofluorophosphate salts, and difluorophosphate salts is preferred because this can, due to the formation of a stable coating film at the negative electrode, improve the battery characteristics after high-temperature storage and the cycle characteristics.

(The Cyclic Carbonate Compounds Having a Carbon-Carbon Unsaturated Bond)

The cyclic carbonate compounds having a carbon-carbon unsaturated bond can be exemplified by vinylene carbonate compounds such as vinylene carbonate, methylvinylene carbonate, ethylvinylene carbonate, 1,2-dimethylvinylene carbonate, 1,2-diethylvinylene carbonate, fluorovinylene carbonate, and trifluoromethylvinylene carbonate; vinylethylene carbonate compounds such as vinylethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, and 1,2-divinylethylene carbonate; and methyleneethylene carbonate compounds such as 1,1-dimethyl-2-methyleneethylene carbonate and 1,1-diethyl-2-methyleneethylene carbonate. Vinylene carbonate, vinylethylene carbonate, and 1,2-divinylethylene carbonate are preferred among the preceding from the standpoints of the cycle characteristics and improving the capacity retention performance after high-temperature storage, while vinylene carbonate and vinylethylene carbonate are more preferred and vinylene carbonate is particularly preferred. A one type of these may be used alone or two or more types may be used in combination.

When two or more types are used in combination, the use of vinylene carbonate in combination with vinylethylene carbonate is preferred.

(Cyclic Carbonate Compounds Having a Fluorine Atom)

Cyclic carbonate containing a fluorine atom can be exemplified by fluoroethylene carbonate, 1,2-difluoroethylene carbonate, 1,1-difluoroethylene carbonate, 1,1,1-trifluoroethylene carbonate, 1,1,2-trifluoroethylene carbonate, tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate.

Fluoroethylene carbonate, 1,2-difluoroethylene carbonate, and 1-fluoro-2-methylethylene carbonate are preferred among the preceding from the standpoints of improving the cycle characteristics and improving the high-temperature storage characteristics. A one type of these may be used alone or two or more types may be used in combination.

In addition, these may be used in combination with a cyclic carbonate compound having a carbon-carbon unsaturated bond and/or with a monofluorophosphate salt or difluorophosphate salt as described below, and this combined use is preferred from the standpoints of improving the cycle characteristics and improving the high-temperature storage characteristics.

(The Monofluorophosphate Salts and Difluorophosphate Salts)

There are no particular limitations on the countercation in the monofluorophosphate salts and difluorophosphate salts, and this countercation can be exemplified by lithium, sodium, potassium, magnesium, calcium, and the ammonium represented by $NR^aR^bR^cR^d$ ($R^a$ to $R^d$ in the formula each independently represent the hydrogen atom or an organic group having 1 to 12 carbon atoms).

The organic group having 1 to 12 carbon atoms, which is represented by the $R^a$ to $R^d$, in this ammonium is not particularly limited and can be, for example, an alkyl group possibly substituted by a halogen atom, a cycloalkyl group possibly substituted by a halogen atom or an alkyl group, an aryl group possibly substituted by a halogen atom or an alkyl group, and a possibly substituted nitrogenous heterocyclic group. Among the preceding, $R^a$ to $R^d$ are each independently preferably the hydrogen atom, an alkyl group, a cycloalkyl group, or a nitrogenous heterocyclic group.

The monofluorophosphate salts and difluorophosphate salts can be specifically exemplified by lithium monofluorophosphate, sodium monofluorophosphate, potassium monofluorophosphate, tetramethylammonium monofluorophosphate, tetraethylammonium monofluorophosphate, lithium difluorophosphate, sodium difluorophosphate, potassium difluorophosphate, tetramethylammonium difluorophosphate, and tetraethylammonium difluorophosphate, with lithium monofluorophosphate and lithium difluorophosphate being preferred and lithium difluorophosphate being more preferred.

These may be used alone or in combination of two or more.

In addition, these may be used in combination with a cyclic carbonate compound having a carbon-carbon unsaturated bond and/or with a cyclic carbonate compound having the fluorine atom, and this combined use is preferred from the standpoints of improving the cycle characteristics and improving the characteristics after high-temperature storage.

When the nonaqueous electrolyte solution contains a cyclic carbonate compound having a carbon-carbon unsaturated bond, the proportion thereof in the nonaqueous electrolyte is preferably at least 0.001 mass %, more preferably at least 0.01 mass %, even more preferably at least 0.1 mass %, and particularly preferably at least 0.3 mass %. When the proportion of the cyclic carbonate compound having a carbon-carbon unsaturated bond is too low, it may then not be possible to adequately realize the effects of improving the battery cycle characteristics and improving the capacity retention performance after high-temperature storage. When, however, the proportion of the cyclic carbonate compound having a carbon-carbon unsaturated bond is too high, the amount of gas generation during high-temperature storage may increase and/or the low-temperature discharge characteristics may decline, and as a consequence not more than 8 mass % is preferred, not more than 4 mass % is more preferred, and not more than 3 mass % is even more preferred.

When the nonaqueous electrolyte solution contains a cyclic carbonate compound having at least one fluorine atom as an auxiliary agent, the proportion thereof in the nonaqueous electrolyte solution is preferably at least 0.001 mass %, more preferably at least 0.1 mass %, even more preferably at least 0.3 mass %, particularly preferably at least 0.5 mass % and preferably not more than 10 mass %, more preferably not more than 5 mass %, and even more preferably not more than 4 mass %, particularly preferably not more than 3 mass %.

When this proportion is below the indicated range, it may not be possible to satisfactorily realize the effects of improving the battery cycle characteristics and the high-temperature storage characteristics, while when the indicated range is exceeded the amount of gas generation during high-temperature storage may increase and/or the low-temperature discharge characteristics may decline.

When the nonaqueous electrolyte solution contains a monofluorophosphate salt and/or a difluorophosphate salt, the proportion thereof in the nonaqueous electrolyte is preferably at least 0.001 mass %, more preferably at least 0.01 mass %, even more preferably at least 0.1 mass %, and particularly preferably at least 0.2 mass % and is preferably not more than 5 mass %, more preferably not more than 3 mass %, and even more preferably not more than 2 mass %.

When this proportion is below the indicated range, it may not be possible to satisfactorily realize the effects of improving the battery cycle characteristics and the high-temperature storage characteristics, while dissolution in the electrolyte solution becomes problematic when the indicated range is exceeded and the effects then tend to be saturated.

The heretofore known overcharge inhibitors can be exemplified by aromatic compounds such as biphenyl, alkylbiphenyls such as 2-methylbiphenyl and 2-ethylbiphenyl, terphenyl, the partial hydrogenates of terphenyl, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ether, dibenzofuran, methyl phenyl carbonate, ethyl phenyl carbonate, diphenyl carbonate, triphenyl phosphate, tris(2-t-butylphenyl)phosphate, tris(3-t-butylphenyl)phosphate, tris(4-t-butylphenyl)phosphate, tris(2-t-amylphenyl)phosphate, tris(3-t-amylphenyl)phosphate, tris(4-t-amylphenyl)phosphate, tris(2-cyclohexylphenyl)phosphate, tris(3-cyclohexylphenyl)phosphate, and tris(4-cyclohexylphenyl)phosphate; the partially fluorinated forms of these aromatic compounds, such as 2-fluorobiphenyl, 3-fluorobiphenyl, 4-fluorobiphenyl, 4,4'-difluorobiphenyl, 2,4-difluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole.

The following are preferred among the preceding: aromatic compounds such as biphenyl, alkylbiphenyls such as 2-methylbiphenyl, terphenyl, the partially hydrogenated terphenyl, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, diphenyl ether, dibenzofuran, methyl phenyl carbonate, diphenyl carbonate, triphenyl phosphate, tris(4-t-butylphenyl)phosphate, and tris(4-cyclohexylphenyl)phosphate, and the partially fluorinated forms of these aromatic compounds, such as 2-fluorobiphenyl, 3-fluorobiphenyl, 4-fluorobiphenyl, 4,4'-difluorobiphenyl, o-cyclohexylfluorobenzene, and p-cyclohexylfluorobenzene. The following are more preferred: the partially hydrogenated terphenyl, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, t-butylbenzene, t-amylbenzene, methyl phenyl carbonate, diphenyl carbonate, triphenyl phosphate, tris(4-t-butylphenyl)phosphate, tris(4-cyclohexylphenyl)phosphate, o-cyclohexylfluorobenzene, and p-cyclohexylfluorobenzene. Cyclohexylbenzene and the partially hydrogenated terphenyl are particularly preferred.

Two or more of the preceding may also be used in combination.

When using two or more types in combination, there is preferably used, in particular, a combination of partially hydrogenated terphenyl or cyclohexylbenzene and t-butylbenzene or t-amylbenzene; or at least one compound selected from among aromatic compounds containing no oxygen atoms, for instance, biphenyl, alkylbiphenyl, terphenyl, partially hydrogenated terphenyl, cyclohexylbenzene, t-butylbenzene, t-amylbenzene or the like, and at least one compound selected from among oxygen-containing aromatic compounds such as diphenyl ether, dibenzofuran or the like, in terms of striking a balance between the overcharge prevention characteristic and high-temperature storage characteristics.

The content of these overcharge inhibitor in the nonaqueous electrolyte solution is preferably at least 0.1 mass %, more preferably at least 0.2 mass %, even more preferably at least 0.3 mass %, particularly preferably at least 0.5 mass %, and preferably not more than 5 mass %, more preferably not more than 3 mass %, even more preferably not more than 2 mass %.

When the concentration is too low, there may be almost no development of the desired effect of the overcharge inhibitor. Conversely, when the concentration is too high, battery characteristics such as the high-temperature storage characteristics may assume a declining trend.

Other auxiliary agents can be exemplified by the following: carbonate compounds such as erythritan carbonate, spirobisdimethylene carbonate, methoxyethyl methyl carbonate, methoxyethyl ethyl carbonate, ethoxyethyl methyl carbonate, and ethoxyethyl ethyl carbonate; carboxylic acid anhydrides such as succinic anhydride, glutaric anhydride, maleic anhydride, itaconic anhydride, citraconic anhydride, glutaconic anhydride, diglycolic anhydride, cyclohexanedicarboxylic anhydride, cyclopentanetetracarboxylic dianhydride, and phenylsuccinic anhydride; dicarboxylate diester compounds such as dimethyl succinate, diethyl succinate, diallyl succinate, dimethyl maleate, diethyl maleate, diallyl maleate, dipropyl maleate, dibutyl maleate, bis(trifluoromethyl) maleate, bis(pentafluoroethyl) maleate, and bis(2,2,2-trifluoroethyl) maleate; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, propylene sulfite, 1,3-propanesultone, 1,4-butanesultone, 1,3-propenesultone, 1,4-butenesultone, methyl methanesulfonate, ethyl methanesulfonate, methyl methoxymethanesulfonate, methyl 2-methoxyethanesulfonate, busulfan, diethylene glycol dimethanesulfonate, 1,2-ethanediol bis(2,2,2-trifluoroethanesulfonate), 1,4-butanediol bis(2,2,2-trifluoroethanesulfonate), sulfolane, 3-sulfolene, 2-sulfolene, dimethyl sulfone, diethyl sulfone, divinyl sulfone, diphenyl sulfone, bis(methylsulfonyl)methane, bis(methylsulfonyl)ethane, bis(ethylsulfonyl)methane, bis(ethylsulfonyl)ethane, bis(vinylsulfonyl)methane, bis(vinylsulfonyl)ethane, N,N-dimethylmethanesulfonamide, N,N-diethylmethanesulfonamide, N,N-dimethyltrifluoromethanesulfonamide, and N,N-diethyltrifloromethanesulfonamide; nitrogenous compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, cycloheptane, methylcyclohexane, ethylcyclohexane, propylcyclohexane, n-butylcyclohexane, t-butylcyclohexane, and dicyclohexyl; fluorinated benzenes such as fluorobenzene, difluorobenzene, pentafluorobenzene, and hexafluorobenzene; fluorinated toluenes such as 2-fluorotoluene, 3-fluorotoluene, 4-fluorotoluene, and benzotrifluoride; nitrile compounds such as acetonitrile, propionitrile, butyronitrile, malononitrile, succinonitrile, glutaronitrile, adiponitrile, and pimelonitrile; and phosphorus-containing compounds such as methyl dimethylphosphinate, ethyl dimethylphosphinate, ethyl diethylphosphinate, trimethyl phosphonoformate, triethyl phosphonoformate, trimethyl phosphonoacetate, triethyl phosphonoacetate, trimethyl 3-phosphonopropionate, and triethyl 3-phosphonopropionate. The following are preferred among the preceding from the standpoint of improving the battery characteristics after high-temperature storage: sulfur-containing compounds such as ethylene sulfite, 1,3-propanesultone, 1,4-butanesultone, 1,3-propenesultone, 1,4-butenesultone, busulfan, and 1,4-butanediol bis(2,2,2-trifluoroethanesulfonate) and nitrile compounds such as acetonitrile, propionitrile, butyronitrile, malononitrile, succinonitrile, glutaronitrile, adiponitrile, and pimelonitrile.

Two or more of the preceding may also be used in combination.

The content of these auxiliary agents in the nonaqueous electrolyte solution is not particularly limited, but is preferably at least 0.01 mass %, more preferably at least 0.1 mass %, and even more preferably at least 0.2 mass % and is preferably not more than 8 mass %, more preferably not more than 5 mass %, even more preferably not more than 3 mass %, and particularly preferably not more than 1 mass %. The addition of such auxiliary agents is preferable in that the addition enhances the capacity retention characteristic after storage at high temperature, as well as the cycle characteristics. There may be almost no development of the effect from the auxiliary agent at a concentration below the indicated lower limit. Conversely, when the concentration is too high, battery characteristics such as the high-load discharge characteristics may decline.

(Preparation of the Electrolyte Solution)

The nonaqueous electrolyte solution according to the present invention can be prepared by dissolving the electrolyte, the compound represented by general formula (1), and any other optional compounds in a nonaqueous solvent. In the preparation of the nonaqueous electrolyte solution, each individual starting material is preferably dried in advance in order to lower the water fraction in the electrolyte solution. Each is preferably dried to 50 ppm or less, more preferably 30 ppm or less, and even more preferably 10 ppm or less. In addition, for example, a drying treatment, deacidification treatment, and so forth may be carried out after the electrolyte solution has been prepared.

The nonaqueous electrolyte solution of the present invention is appropriate for use as a nonaqueous electrolyte solution for secondary batteries from among nonaqueous electrolyte batteries, namely, nonaqueous electrolyte secondary batteries, for instance lithium secondary batteries. A nonaqueous electrolyte secondary battery that uses the nonaqueous electrolyte solution of the present invention will be hereinafter explained.

<Nonaqueous Electrolyte Secondary Battery>

The nonaqueous electrolyte secondary battery of the present invention is a nonaqueous electrolyte battery that comprises a negative electrode and a positive electrode that are capable of absorbing and releasing lithium ions, and a nonaqueous electrolyte solution, wherein the nonaqueous electrolyte solution is the above-described nonaqueous electrolyte solution of the present invention.

(The Battery Configuration)

Except for its fabrication using the nonaqueous electrolyte solution of the present invention, the nonaqueous electrolyte secondary battery according to the present invention is a nonaqueous electrolyte battery that contains the same nonaqueous electrolyte and negative and positive electrodes capable of lithium ion absorbing and releasing as heretofore known nonaqueous electrolyte secondary batteries, and is generally obtained by housing the positive electrode and negative electrode in a case with a porous membrane impregnated with the nonaqueous electrolyte of the present invention interposed therebetween. There are thus no particular limitations on the shape of the nonaqueous electrolyte secondary battery of the present invention, and it may be cylindrical, rectangular, a laminate type, a coin type, a large battery, and so forth.

(Negative Electrode Active Material)

The negative electrode active material is not particularly limited, so long as it is capable of absorbing and releasing lithium ions. Specific examples thereof include, for instance, carbonaceous materials, alloy-based materials, lithium-containing metal complex oxide materials, and the like.

These negative electrode active materials may be used alone or as a mixture of two or more. Carbonaceous materials and alloy-based materials are preferred among the preceding.

The following are preferred among carbonaceous materials: amorphous carbon materials, graphite, and carbonaceous material provided by coating the surface of a graphite with a carbon that is amorphous in comparison to the graphite. Graphite and carbonaceous material provided by coating the surface of a graphite with a carbon that is amorphous in comparison to the graphite, generally provide a high energy density and are thus preferred.

Preferred graphite has a d-value (interlayer distance), of lattice planes (002 planes), as determined by X-ray diffraction in accordance with the method by the Gakushin (Japan Society for Promotion of Science), that is 0.335 to 0.338 nm, and particularly preferred graphite has the d-value of 0.335 to 0.337 nm. In addition, the crystallite size (Lc) as determined by x-ray diffraction by the Gakushin (Japan Society for the Promotion of Science) method is preferably at least 10 nm, more preferably at least 50 nm, and even more preferably at least 100 nm. An ash content is preferably not more than 1 mass %, more preferably not more than 0.5 mass %, and even more preferably not more than 0.1 mass %.

The carbonaceous material provided by coating the surface of a graphite with amorphous carbon is preferably one in which the nucleus is a graphite having a lattice plane (002 plane) d value by x-ray diffraction of 0.335 to 0.338 nm, in which there is bonded to the surface of this nucleus a carbonaceous material having a lattice plane (002 plane) d value by x-ray diffraction that is larger than that of the nucleus, and in which the proportion between the nucleus and the carbonaceous material having a lattice plane (002 plane) d value by x-ray diffraction larger than that of the nucleus is 99/1 to 80/20 as the mass ratio. The use thereof makes possible the fabrication of a negative electrode that has a high capacity and is resistant to reaction with the electrolyte solution.

The particle diameter of the carbonaceous material is the median diameter as determined by laser diffraction scattering method and is preferably at least 1 μm, more preferably at least 3 μm, even more preferably at least 5 μm, and particularly preferably at least 7 μm and is preferably not more than 100 μm, more preferably not more than 50 μm, even more preferably not more than 40 μm, and particularly preferably not more than 30 μm.

The specific surface area of the carbonaceous material by the BET method is preferably at least 0.3 m$^2$/g, more preferably at least 0.5 m$^2$/g, even more preferably at least 0.7 m$^2$/g, and particularly preferably at least 0.8 m$^2$/g and is preferably not more than 25.0 m$^2$/g, more preferably not more than 20.0 m$^2$/g, even more preferably not more than 15.0 m$^2$/g, and particularly preferably not more than 10.0 m$^2$/g.

In addition, in the analysis of the carbonaceous material by Raman spectroscopy using argon ion laser radiation, letting $I_A$ be the peak intensity of the peak $P_A$ that is in the 1570 to 1620 cm$^{-1}$ region and letting $I_B$ be the peak intensity of the peak $P_B$ in the 1300 to 140 cm$^{-1}$ range, a carbonaceous material is preferred for which the R value given by the ratio between $I_B$ and $I_A$ ($=I_B/I_A$) is in the range from 0.01 to 0.7. Moreover, a carbonaceous material is preferred for which the full width at half maximum of the peak in the 1570 to 1629 cm$^{-1}$ range is not more than 26 cm$^{-1}$ and particularly not more than 25 cm$^{-1}$.

The alloy-based material is not particularly limited so long as it is capable of absorbing and releasing lithium, and may be any from among a single metal or alloy that forms a lithium alloy, or a compound, for instance an oxide, carbide, nitride, silicide, sulfide or phosphide of the foregoing. The alloy-based material is preferably a material comprising a single metal and alloy that forms a lithium alloy, more preferably a material comprising a metal/semimetal element (excluding carbon) of groups 13 and 14, even more preferably a single metal such as aluminum, silicon or tin (hereafter, these single metals may be referred to as "specific metal elements"), as well as alloys or compounds that comprise the foregoing elements.

Examples of the negative electrode active material having at least one type of atom selected from among the specific metal elements include, for instance, a single metal of any one type of the specific metal elements; alloys comprising two or more types of the specific metal elements; alloys that comprise one type or two or more types of the specific metal elements plus another one type or two or more types of metal elements; compounds containing one type or two or more types of the specific metal elements; as well as complex compounds thereof, such as oxides, carbides, nitrides, silicides, sulfides, and phosphides. The capacity of the battery can be increased through the use of these single metals, alloys and metal compounds as the negative electrode active material.

Examples of the complex compounds include, for instance, compounds wherein a plurality of types of elements, for instance single metals, alloys and non-metallic elements, are bonded to each other in complex manners. Specifically, in the case of silicon and tin, for instance, there can be used alloys of these elements with metals that do not act as a negative electrode. In the case of tin, for instance, there can be used a complex compound that comprises 5 to 6 elements including a combination of a metal, other than tin and silicon, that acts as a negative electrode, a metal that does not act as a negative electrode, and a non-metallic element.

From among the abovementioned negative electrode active materials there is preferably used, for instance, any one single metal of the specific metal elements, or an alloy of two or more types of the specific metal elements, or an oxide, carbide or nitride of the specific metal elements, on account of the substantial capacity per unit mass that is afforded in the resulting battery. In particular, a single metal, alloy, oxide, carbide, nitride or the like of silicon and/or tin is preferably used on account of the large capacity per unit mass.

The following silicon- and/or tin-containing compounds, while having a poorer capacity per unit mass than for the use of a simple metal or an alloy, are preferred for their excellent cycle characteristics.

Silicon and/or tin oxides in which the elemental ratio between the silicon and/or tin and the oxygen is preferably at least 0.5, more preferably at least 0.7, and even more preferably at least 0.9 and is preferably not more than 1.5, more preferably not more than 1.3, and even more preferably not more than 1.1.

Silicon and/or tin nitrides in which the elemental ratio between the silicon and/or tin and the nitrogen is preferably at least 0.5, more preferably at least 0.7, and even more preferably at least 0.9 and is preferably not more than 1.5, more preferably not more than 1.3, and even more preferably not more than 1.1.

Silicon and/or tin carbides in which the elemental ratio between the silicon and/or tin and the carbon is preferably at least 0.5, more preferably at least 0.7, and even more preferably at least 0.9 and is preferably not more than 1.5, more preferably not more than 1.3, and even more preferably not more than 1.1. These alloy-based materials may be powders or thin films and may be crystalline or amorphous.

The average particle diameter of the alloy-based material for realizing the effects of the present invention is not particularly limited, but is preferably not more than 50 μm, more preferably not more than 20 μm, and even more preferably not more than 10 μm and is preferably at least 0.1 μm, more preferably at least 1 μm, and even more preferably at least 2 μm. When the particle diameter is too large, a large amount of electrode expansion occurs and the cycle characteristics may end up declining. When the particle diameter is too small, this hinders current collection and the capacity may not be fully realized.

The lithium-containing metal complex oxide material used as the negative electrode active material is not particularly limited, so long as it is capable of absorbing and releasing lithium, but, is preferably a complex oxide of lithium and titanium (hereafter also referred to as "lithium titanium complex oxide" for short).

Also, compounds provided by replacing a portion of the lithium and/or titanium in the lithium-titanium complex oxide with another metal element, for instance at least one element selected from the group consisting of Na, K, Co, Al, Fe, Mg, Cr, Ga, Cu, Zn and Nb are preferred.

A lithium titanium complex oxide given by $Li_xTi_yM_zO_4$ wherein $0.7 \leq x \leq 1.5$, $1.5 \leq y \leq 2.3$, and $0 \leq z \leq 1.6$ is preferred because this composition is stable to lithium ion absorbing and releasing (M represents at least one element selected from the group consisting of Na, K, Co, Al, Fe, Mg, Cr, Ga, Cu, Zn, and Nb).

For z=0 in the lithium titanium complex oxide given by $Li_xTi_yM_zO_4$, compositions in which x and y satisfy any of the following (a) to (c) are preferred among the preceding because they have well-balanced battery properties.

(a) $1.2 \leq x \leq 1.4$, $1.5 \leq y \leq 1.7$, $z=0$
(b) $0.9 \leq x \leq 1.1$, $1.9 \leq y \leq 2.1$, $z=0$
(c) $0.7 \leq x \leq 0.9$, $2.1 \leq y \leq 2.3$, $z=0$ More preferred representative compositions include $Li_{4/3}Ti_{5/3}O_4$ for (a), $Li_1Ti_2O_4$ for (b) and $Li_{4/5}Ti_{11/5}O_4$ for (c)

Preferred instances of a composition where $Z \neq 0$ include $Li_{4/3}Ti_{4/3}Al_{1/3}O_4$.

(Positive Electrode Active Material)

The positive electrode active material is not particularly limited, so long as it is capable of absorbing and releasing lithium ions. A preferred substance contains lithium and at least one transition metal, examples of which include, for instance, lithium-transition metal complex oxides, lithium-containing transition metal phosphate compounds, and the like.

Preferred examples of transition metals in lithium-transition metal complex oxides include, for instance, V, Ti, Cr, Mn, Fe, Co, Ni, Cu or the like. Specific examples include, for instance, lithium-cobalt complex oxides such a $LiCoO_2$, lithium-nickel complex oxides such a $LiNiO_2$, and lithium-manganese complex oxides such as $LiMnO_2$, $LiMn_2O_4$, and $Li_2MnO_3$. Additional examples are provided by substituting another metal for a portion of the main transition metal atom in the aforementioned lithium transition metal complex oxides, i.e., lithium transition metal complex oxides provided by replacing a portion of the Co in a lithium cobalt complex oxide with another metal such as Al, Ti, V, Cr, Mn, Fe, Li, Ni, Cu, Zn, Mg, Ga, Zr, or Si; lithium transition metal complex oxides provided by replacing a portion of the Ni in a lithium nickel complex oxide with another metal such as Al, Ti, V, Cr, Mn, Fe, Co, Li, Cu, Zn, Mg, Ga, Zr, or Si; and lithium transition metal complex oxides provided by replacing a portion of the Mn in a lithium manganese complex oxide with another metal such as Al, Ti, V, Cr, Fe, Co, Li, Ni, Cu, Zn, Mg, Ga, Zr, or Si. Among the lithium transition metal complex oxides provided by substituting another metal for a portion of the main transition metal atom in a lithium transition metal complex oxide, $LiNi_{1-a-b}Mn_aCo_bO_2$ (a and b represent numbers equal to or greater than 0 and less than 1, but excluding the case in which a and b are both 0) and $LiNi_{1-c-d-e}Co_cAl_dMg_eO_2$ (C, d, and e represent numbers equal to or greater than 0 and less than 1, but excluding the case in which c, d, and e are all 0) are preferred; $LiNi_{1-a-b}Mn_aCo_bO_2$ ($0 \leq a < 0.4$, $0 \leq b < 0.4$) and $LiNi_{1-c-d-e}Co_cAl_dMg_eO_2$ ($0 \leq c < 0.3$, $0 \leq d < 0.1$, $0 \leq e < 0.05$) are more preferred; and $LiNi_{1/3}Co_{1/3}Mn_{1/3}O_2$, $LiNi_{0.5}Co_{0.3}Mn_{0.2}O_2$, $LiNi_{0.5}Mn_{0.5}O_2$, $LiNi_{0.85}Co_{0.10}Al_{0.05}O_2$, and $LiNi_{0.85}Co_{0.10}Al_{0.03}Mg_{0.02}O_2$ are particularly preferred.

Preferred examples of transition metals in lithium-transition metal complex oxides include, for instance, V, Ti, Cr, Mn, Fe, Co, Ni, Cu or the like. Specific examples include, for instance, iron phosphates such as $LiFePO_4$, $Li_3F_2(PO_4)_3$, and $LiFeP_2O_7$, and cobalt phosphates such a $LiCoPO_4$. Additional examples are provided by substituting another metal for a portion of the main transition metal atom in the aforementioned lithium transition metal phosphate compounds, i.e., lithium transition metal phosphate compounds provided by replacing a portion of the Fe in an iron phosphate with another metal such as Al, Ti, V, Cr, Mn, Co, Li, Ni, Cu, Zn, Mg, Ga, Zr, Nb, or Si, and lithium transition metal phosphate compounds provided by replacing a portion of the Co in a cobalt phosphate with another metal such as Al, Ti, V, Cr, Mn, Fe, Li, Ni, Cu, Zn, Mg, Ga, Zr, Nb, or Si.

These positive electrode active materials may be used alone or in combination of a plurality thereof. A surface cover may be used in which a substance (surface deposition substance) having composition different from that of the surface of the positive electrode active material is deposited on the surface of the positive electrode active material. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; and carbonates such as lithium carbonate, calcium carbonate, magnesium carbonate, and the like.

The amount of surface deposition substance for realizing the effects of the present invention is not particularly limited, but is preferably at least 0.1 ppm, more preferably 1 ppm, even more preferably 10 ppm, and is preferably not more than 20%, more preferably not more than 10% and even more preferably 5%, with respect to the positive electrode active material by mass. The surface deposition substance allows suppressing oxidation reactions of the nonaqueous electrolyte solution at the positive electrode active material surface, and allows enhancing battery life. However, the effect elicited by the surface deposition substance fails to be sufficiently brought out if the deposition amount is excessively low, while if the deposition amount is excessively large, resistance may increase as a result of hindered traffic of lithium ions.

(Electrode Production)

Any material that is stable to the electrolyte solution and the solvent used during electrode production may be used as the binder for binding the active material. Examples here are fluororesins such as polyvinylidene fluoride and polytetrafluoroethylene; polyolefins such as polyethylene and polypropylene; unsaturated bond-containing polymers such as styrene butadiene rubber, isoprene rubber, and butadiene rubber; and acrylic acid polymers such as ethylene-acrylic acid copolymers and ethylene-methacrylic acid copolymers.

The electrodes may incorporate a thickener, electroconductive material, filler, and so forth, in order to raise the mechanical strength and/or the electrical conductivity. Examples of the thickener include, for instance, carboxylmethyl cellulose, methyl cellulose, hydroxymethyl cellulose, ethyl cellulose, polyvinyl alcohol, starch oxide, phosphorylated starch, and casein.

Examples of the conductive material include, for instance, metallic materials such as copper or nickel; and carbon materials such as graphite or carbon black. The electrodes may be produced by ordinary methods. For instance, a binder, a thickener, a conductive material, a solvent, and the like, are added to the negative or the positive electrode active material, to yield a slurry that is then applied onto a current collector and is dried, followed by pressing. The electrode can be formed thereby.

In addition, the binder, conductive material, and the like, may be added to the active material and this may be directly formed by rolling to make a sheet electrode or may be compression molded to make a pellet electrode, or a thin film of the electrode material may also be formed on a current collector by a procedure such as, for example, vapor deposition, sputtering, or plating.

When graphite is used for the negative electrode active material, the density of the negative electrode active material layer after drying and pressing is preferably at least 1.45 g/cm$^3$, more preferably at least 1.55 g/cm$^3$, even more preferably at least 1.60 g/cm$^3$, and particularly preferably at least 1.65 g/cm$^3$.

The density of the positive electrode active material layer after drying and pressing is preferably at least 2.0 g/cm$^3$, more preferably at least 2.5 g/cm$^3$, and even more preferably at least 3.0 g/cm$^3$. Various current collectors may be used, but a metal or an alloy is typically used. The current collector for the negative electrode can be exemplified by copper, nickel, and stainless steel where copper is preferred. The current collector for the positive electrode can be exemplified by a metal such as aluminum, titanium, and tantalum and by their alloys where aluminum and its alloys are preferred.

(The Separator and the Outer Container)

A porous membrane (separator) is interposed between the positive electrode and the negative electrode, in order to prevent short-circuits. The electrolyte solution is used in this case impregnated into the porous membrane. With regard to its material and shape, this porous membrane should be stable in the electrolyte solution and should have an excellent liquid retention behavior, but is not otherwise particularly limited, and porous sheets and nonwoven fabrics based on a polyolefin, e.g., polyethylene, polypropylene, and so forth, are preferred.

A battery outer package to be used for the battery according to the present invention may also be of any material, and there is used nickel-plated iron, stainless steel, aluminum or alloys thereof, nickel, titanium, laminate film or the like. The operating voltage of the nonaqueous electrolyte secondary battery of the present invention is generally in the range from 2 V to 4.9 V.

EXAMPLES

The present invention will be hereinafter explained in more detail based on examples and comparative examples. However, the present invention is not limited to these examples as long as the present invention does not depart from the spirit of the present invention.

The evaluation methods used in the following examples and comparative examples are described in the following.

[Evaluation of the High-Temperature Continuous Charging Properties]

The volume of the battery was measured by immersion in an ethanol bath, followed by constant-current charging at 60° C. at a constant current of 0.5 C. When 4.25 V was reached, the switch was made to constant-voltage charging and continuous charging was performed for 1 week.

Following the continuous charging test, after cooling of the battery to 25° C., the volume of the battery was measured through immersion in an ethanol bath, to work out the amount of gas generated, on the basis of changes in volume before and after the continuous charging.

After measurement of the amount of the generated gas, the battery was discharged down to 3 V, at a constant current of 0.2 C, at a temperature of 25° C., and the residual capacity after the continuous charging test was measured. The percentage of the residual capacity with respect to the initial discharge capacity was calculated and designated the residual capacity (%) after the continuous charging test.

Charging to 4.2 V at a constant current of 0.5 C was carried out at 25° C. followed by charging at a constant voltage of 4.2 V until the current value reached 0.05 C. The 1 C discharge capacity after the continuous charging test was then measured during discharge to 3 V at a constant current of 1 C, and the percentage of the 1 C discharge capacity after the continuous charging test with respect to the initial discharge capacity was calculated and designated the 1 C capacity (%) after the continuous charging test.

Example 1

[Production of the Negative Electrode]

6 mass parts of a polyvinylidene fluoride (product name: "KF-1000", from the Kureha Corporation) was mixed with 94 mass parts of a natural graphite powder and this was slurried by the addition of N-methyl-2-pyrrolidone; the natural graphite powder had a lattice plane (002 plane) d value by x-ray diffraction of 0.336 nm, a crystallite size (Lc) of 652 nm, an ash content of 0.07 mass parts, a median diameter by laser diffraction scattering of 12 μm, a specific surface area by the BET method of 7.5 m$^2$/g, and, according to a determination by Raman spectroscopic analysis using argon ion laser radiation, an R value ($=I_B/I_A$) of 0.12 and a full width at half maximum value of 19.9 cm$^{-1}$ for the peak in the 1570 to 1620 cm$^{-1}$ region. A negative electrode was made by uniformly coating this slurry on one side of a 12 μm-thick copper foil followed by drying and then pressing to provide a density for the negative electrode active material layer of 1.67 g/cm$^3$.

[Production of the Positive Electrode]

90 mass parts of LiCoO$_2$, 4 mass parts of carbon black, and 6 mass parts of polyvinylidene fluoride (product name: "KF-1000", from the Kureha Corporation) were mixed and slurried by the addition of N-methyl-2-pyrrolidone, and a positive electrode was made by uniformly coating this on both sides of a 15 μm-thick aluminum foil followed by drying and then pressing to provide a density for the positive electrode active material layer of 3.2 g/cm$^3$.

[Production of an Electrolyte Solution]

A electrolyte solution was obtained by preparing a mixture of ethylene carbonate, ethylmethyl carbonate, and dimethyl carbonate (volume ratio 3:3:4), then mixing 2 mass % of vinylene carbonate with the mixture, and subsequently dissolving sufficiently dried LiPF$_6$ in the mixture to a proportion of 1.0 mol/litter, in a dry argon atmosphere. And then, 1,2-dimethoxypropane were mixed with the electrolyte solution to provide a concentration of 0.1 ppm.

[Nonaqueous Electrolyte Solution]

The above-described positive electrode, negative electrode, and a polyethylene separator were sequentially stacked, in the order of negative electrode, separator and positive electrode, to produce a battery element. The battery element was inserted into a bag comprising a laminate film in which aluminum (thickness 40 μm) was covered, on both sides, by a resin layer, while causing the terminals of the positive electrode and the negative electrode to be disposed protrusively. Thereafter, the above-described electrolyte solution was poured into the bag, which was then vacuum-sealed, to prepare a sheet-like battery, and subjected to evaluation of high-temperature continuous charging properties. The evaluation results are given in Table 1.

Example 2

A sheet-shaped battery was fabricated proceeding as in Example 1, but in this case adding 1 ppm 1,2-dimethoxypropane to the electrolyte solution of Example 1, and the high-temperature continuous charging properties were evaluated. The evaluation results are given in Table 1.

Example 3

A sheet-shaped battery was fabricated proceeding as in Example 1, but in this case adding 10 ppm 1,2-dimethoxypropane to the electrolyte solution of Example 1, and the high-temperature continuous charging properties were evaluated. The evaluation results are given in Table 1.

Example 4

A sheet-shaped battery was fabricated proceeding as in Example 1, but in this case adding 20 ppm 1,2-dimethoxypropane to the electrolyte solution of Example 1, and the high-temperature continuous charging properties were evaluated. The evaluation results are given in Table 1.

Example 5

A sheet-shaped battery was fabricated proceeding as in Example 1, but in this case adding 30 ppm 1,2-dimethoxypropane to the electrolyte solution of Example 1, and the high-temperature continuous charging properties were evaluated. The evaluation results are given in Table 1.

Example 6

A sheet-shaped battery was fabricated proceeding as in Example 1, but in this case adding 80 ppm 1,2-dimethoxypropane to the electrolyte solution of Example 1, and the high-temperature continuous charging properties were evaluated. The evaluation results are given in Table 1.

Comparative Example 1

A sheet-shaped battery was fabricated proceeding as in Example 1, but in this case adding 200 ppm 1,2-dimethoxypropane to the electrolyte solution of Example 1, and the high-temperature continuous charging properties were evaluated. The evaluation results are given in Table 1.

Comparative Example 2

A sheet-shaped battery was fabricated proceeding as in Example 1, but in this case adding 500 ppm 1,2-dimethoxypropane to the electrolyte solution of Example 1, and the high-temperature continuous charging properties were evaluated. The evaluation results are given in Table 1.

Comparative Example 3

A sheet-shaped battery was fabricated proceeding as in Example 1, but in this case changing the 1,2-dimethoxypropane in the electrolyte solution of Example 3 to 1,2-dimethoxyethane, and the high-temperature continuous charging properties were evaluated. The evaluation results are given in Table 1.

Reference Example

A sheet-shaped battery was fabricated proceeding as in Example 1, but in this case without adding the 1,2-dimethoxypropane to the electrolyte solution of Example 1, and the high-temperature continuous charging properties were evaluated.

The evaluation results are given in Table 1.

TABLE 1

Results of the evaluation of the continuous charging properties

| | 1,2-Dimethoxypropane | | | Amount of gas | Residual capacity | 1 C discharge capacity after |
| --- | --- | --- | --- | --- | --- | --- |
| | Concentration with reference to the dimethyl carbonate (ppm) | Concentration in the nonaqueous solvent (*2) (ppm) | Concentration in the electrolyte solution (ppm) | generation after high-temperature continuous charging (mL) | after high-temperature continuous charging (%) | high-temperature continuous charging (%) |
| Ex. 1 | 0.3 | 0.1 | 0.1 | 0.24 | 94 | 92 |
| Ex. 2 | 3 | 1 | 1 | 0.20 | 93 | 87 |
| Ex. 3 | 31 | 12 | 10 | 0.21 | 96 | 71 |
| Ex. 4 | 61 | 23 | 20 | 0.17 | 91 | 85 |
| Ex. 5 | 92 | 35 | 30 | 0.26 | 95 | 72 |
| Ex. 6 | 245 | 93 | 80 | 0.24 | 97 | 74 |
| CE 1 | 612 | 232 | 200 | 0.32 | 91 | 67 |
| CE 2 | 1530 | 581 | 500 | 0.30 | 87 | 68 |

TABLE 1-continued

Results of the evaluation of the continuous charging properties

| | 1,2-Dimethoxypropane | | | Amount of gas generation after high-temperature continuous charging (mL) | Residual capacity after high-temperature continuous charging (%) | 1 C discharge capacity after high-temperature continuous charging (%) |
|---|---|---|---|---|---|---|
| | Concentration with reference to the dimethyl carbonate (ppm) | Concentration in the nonaqueous solvent (*2) (ppm) | Concentration in the electrolyte solution (ppm) | | | |
| CE 3 | 245(*1) | 93(*1) | 80(*1) | 0.32 | 88 | 68 |
| Reference Ex. | — | — | — | 0.30 | 95 | 59 |

(*1)1,2-Dimethoxyethane Content
(*2)Concentration in the nonaqueous solvent (mixture of ethylene carbonate:ethyl methyl carbonate:dimethyl carbonate = 3:3:4 as the volumetric ratio)

As is clear from Table 1, Examples 1 to 6 present low amounts of gas generation and high residual capacities and 1 C discharge capacities and thus have excellent high-temperature continuous charge properties. In contrast to this, Comparative Example 1, which has a 1,2-dimethoxypropane concentration in the electrolyte solution of 200 ppm, while having the same residual capacity after high-temperature continuous charging as in Example 4, presents a large amount of gas generation and has a lower IC discharge capacity after high-temperature continuous charging than in Examples 1 to 6. As compared to Examples 1 to 6, Comparative Example 2, which has a 1,2-dimethoxypropane concentration in the electrolyte solution of 500 ppm, presents a larger amount of gas generation and both a lower residual capacity and a lower IC discharge capacity after high-temperature continuous charging. As compared to Examples 1 to 6, Comparative Example 3, in which the 1,2-dimethoxypropane in Example 6 is changed to 1,2-dimethoxyethane, again presents a larger amount of gas generation and both a lower residual capacity and a lower 1 C discharge capacity after high-temperature continuous charging. In addition, for the electrolyte solution that does not contain 1,2-dimethoxypropane in accordance with the reference example, the residual capacity is the same as in Examples 1 to 6, but the amount of gas generation is larger and the 1 C discharge capacity after high-temperature continuous charging is lower.

Based on these results, it can be concluded that 1,2-dimethoxyethane and a content in the electrolyte solution of 200 ppm or more of 1,2-dimethoxypropane exercise a negative effect on the high-temperature continuous charging properties, while, conversely, an improvement in the properties is an effect specific to a 1,2-dimethoxypropane content of less than 200 ppm. While the reason for the appearance of this effect is not clear, it is thought that the compound with general formula (1) forms, during initial charging, a strong coating film, together with other components of the electrolyte solution, at the surface of the positive electrode, thereby inhibiting reactions between the electrolyte solution and the high-activity electrode and improving the high-temperature continuous charging properties as a consequence.

While the invention has been described in detail and with reference to specific embodiments thereof, it will be apparent to one skilled in the art that various changes and modifications can be made therein without departing from the spirit and scope thereof.

INDUSTRIAL APPLICABILITY

The nonaqueous electrolyte battery that uses the nonaqueous electrolyte solution of the present invention has a large capacity and excellent high-temperature continuous charging characteristics and can therefore be used in various known applications. Specific examples thereof include, for instance, notebook computers, pen-input PCs, mobile PCs, e-book players, mobile phones, portable fax machines, portable copiers, mobile printers, stereo headphones, video movies, LCD TVs, handy cleaners, portable CDs, Mini Discs, walkie-talkies, electronic organizers, calculators, memory cards, portable tape recorders, radios, back-up power supplies, motors, automobiles, motorcycles, mopeds, bicycles, lighting fixtures, toys, gaming devices, clocks, electric tools, strobes, cameras, power sources for load leveling, and power sources for natural energy storage.

The invention claimed is:

1. A nonaqueous electrolyte solution comprising a lithium salt and a nonaqueous solvent that dissolves the lithium salt, wherein the nonaqueous electrolyte solution contains from at least 0.01 ppm to not more than 30 ppm by mass of a compound represented by the following general formula (1):

$$R^1\text{—}CR^2OR^3\text{—}CR^2{}_2OR^3 \qquad (1)$$

in formula (1), $R^1$ and $R^3$ represent an organic group having 1 to 10 carbon atoms and optionally having a substituent; $R^2$ represents hydrogen or an organic group having 1 to 10 carbon atoms and optionally having a substituent; and $R^1$ to $R^3$ may each represent the same group or may each represent different groups.

2. The nonaqueous electrolyte solution according to claim 1, wherein the nonaqueous electrolyte solution contains the compound represented by general formula (1) at from at least 0.01 ppm to not more than 25 ppm by mass.

3. A nonaqueous electrolyte solution comprising a lithium salt and a nonaqueous solvent that dissolves the lithium salt, wherein the nonaqueous solvent contains from at least 0.01 ppm to not more than 30 ppm by mass of a compound represented by the following general formula (1)

$$R^1\text{—}CR^2OR^3\text{—}CR^2{}_2OR^3 \qquad (1)$$

in formula (1), $R^1$ and $R^3$ represent an organic group having 1 to 10 carbon atoms and optionally having a substituent; $R^2$ represents hydrogen or an organic group having 1 to 10 carbon atoms and optionally having a substituent; and $R^1$ to $R^3$ may each represent the same group or may each represent different groups.

4. The nonaqueous electrolyte solution according to claim 1, wherein the nonaqueous solvent comprises at least dimethyl carbonate or ethyl methyl carbonate.

5. The nonaqueous electrolyte solution according to claim 1, wherein the compound represented by general formula (1) is 1,2-dimethoxypropane or 1,2-dimethoxybutane.

6. A nonaqueous electrolyte battery comprising a nonaqueous electrolyte and a negative electrode and a positive electrode that are capable of the insertion and extraction of the lithium ion, wherein the nonaqueous electrolyte solution is the nonaqueous electrolyte solution according to claim 1.

7. The nonaqueous electrolyte battery according to claim 6, wherein the negative electrode contains a carbon material as a negative electrode active material.

8. A dimethyl carbonate nonaqueous solvent that contains from at least 0.01 ppm by mass to not more than 40 ppm by mass of 1,2-dimethoxypropane.

* * * * *